US009480944B2

(12) United States Patent
Ballantyne et al.

(10) Patent No.: US 9,480,944 B2
(45) Date of Patent: Nov. 1, 2016

(54) PROCESS FOR REMOVAL OF SILOXANES AND RELATED COMPOUNDS FROM GAS STREAMS

(71) Applicant: Guild Associates Inc., Dublin, OH (US)

(72) Inventors: Ryan Ballantyne, Columbus, OH (US); Wayne Ballantyne, Columbus, NY (US); Mike Knapke, Plain City, OH (US); David Neumann, Reynoldsburg, OH (US); Joe Rossin, Columbus, OH (US)

(73) Assignee: GUILD ASSOCIATES INC., Dublin, OH (US)

( * ) Notice: Subject to any disclaimer, the term of this patent is extended or adjusted under 35 U.S.C. 154(b) by 33 days.

(21) Appl. No.: 14/678,907

(22) Filed: Apr. 3, 2015

(65) Prior Publication Data
US 2015/0209717 A1    Jul. 30, 2015

Related U.S. Application Data

(63) Continuation-in-part of application No. 13/920,161, filed on Jun. 18, 2013, now Pat. No. 9,039,807.

(51) Int. Cl.
*B01D 53/04* (2006.01)

(52) U.S. Cl.
CPC ........... *B01D 53/0462* (2013.01); *B01D 53/04* (2013.01); *B01D 2253/104* (2013.01); *B01D 2253/106* (2013.01); *B01D 2253/108* (2013.01); *B01D 2253/1124* (2013.01); *B01D 2253/30* (2013.01); *B01D 2253/304* (2013.01); *B01D 2256/245* (2013.01); *B01D 2257/55* (2013.01); *B01D 2257/553* (2013.01); *B01D 2258/05* (2013.01); *B01D 2259/4009* (2013.01); *B01D 2259/4143* (2013.01)

(58) Field of Classification Search
CPC ............. B01D 53/04; B01D 53/0462; B01D 2253/102; B01D 2253/30; B01D 2253/304; B01D 2253/104; B01D 2253/106; B01D 2253/108; B01D 2256/245; B01D 2257/55; B01D 2258/05; C10L 3/101; C10L 2290/12; C10L 2290/26; C10L 2290/542
USPC ....... 95/90, 114–116, 148; 423/210; 585/820
See application file for complete search history.

(56) References Cited

U.S. PATENT DOCUMENTS

| | | | |
|---|---|---|---|
| 5,899,187 A | 5/1999 | Gruber et al. | 123/198 R |
| 7,025,803 B2 | 4/2006 | Wascheck et al. | 95/50 |
| 7,264,648 B1* | 9/2007 | Wetzel | B01D 53/04 95/11 |
| 7,306,652 B2 | 12/2007 | Higgins | 95/97 |
| 7,393,381 B2 | 7/2008 | Tower et al. | 95/8 |
| 2007/0068386 A1 | 3/2007 | Mitariten | 95/116 |
| 2008/0179177 A1 | 7/2008 | Cha | 204/157.43 |
| 2012/0024157 A1 | 2/2012 | Maheshwary et al. | 96/133 |
| 2013/0060074 A1 | 3/2013 | Pierce | 585/802 |
| 2013/0137567 A1 | 5/2013 | Stasko | 502/5 |
| 2013/0139690 A1* | 6/2013 | Ohuchi | B01D 53/02 96/4 |
| 2013/0209338 A1 | 8/2013 | Prasad et al. | 423/219 |
| 2013/0340616 A1* | 12/2013 | Iyer | C10L 3/08 95/186 |
| 2014/0171304 A1 | 6/2014 | Herrera et al. | 502/401 |
| 2015/0118137 A1* | 4/2015 | Hoang | B01J 20/186 423/245.1 |
| 2015/0119623 A1* | 4/2015 | Huang | C10L 3/101 585/802 |

FOREIGN PATENT DOCUMENTS

WO    2009/092983 A1    7/2009    ............ B01D 53/04

OTHER PUBLICATIONS

Huppmann, Rene et al., "Cyclic Siloxanes in the Biological Waste Water Treatment Process-Determination, Quantification and Possibilities of Elimination," Fresenius Journal of Analytical Chemistry 354, pp. 66-71, (1996), Mar. 17, 1995.
Finocchio et al., "Purification of Biogases from Siloxanes by Adsorption: on the Regenerability of Activated Carbon Sorbents," Energy and Fuels 23, pp. 4156-4159, (2009), Jun. 25, 2009.

* cited by examiner

*Primary Examiner* — Frank Lawrence
(74) *Attorney, Agent, or Firm* — Slayden Grubert Beard PLLC

(57) ABSTRACT

The present invention is directed to an improved process for removing siloxanes from a biogas feed comprising (i) passing a gas feed through an adsorbent bed having an adsorbent having an inert surface to adsorb onto the adsorbent at least a portion of the siloxanes in the gas feed; and (ii) regenerating the adsorbent by removing siloxanes from the adsorbent. The adsorbent surface is rendered inert or nearly inert preferably via calcination.

20 Claims, No Drawings

PROCESS FOR REMOVAL OF SILOXANES AND RELATED COMPOUNDS FROM GAS STREAMS

CROSS-REFERENCE TO RELATED APPLICATIONS

This application is a continuation-in-part of U.S. application Ser. No. 13/920,161 filed on Jun. 18, 2013, which is incorporated herein in its entirety.

FIELD OF THE INVENTION

The present invention relates to a regenerative adsorption process for the removal of siloxanes from process streams associated with landfill gas and digester gas (collectively referred to herein as "biogas"). The present invention, according to one embodiment, is directed to processes using filtration media that inhibits reactions leading to the decomposition or polymerization of siloxanes.

BACKGROUND OF THE INVENTION

Definition of Siloxanes:

The term "siloxanes" generally refers to a class of organosilicon compounds with Si—O—Si linkage. Siloxanes may be cyclic or linear. Cyclic siloxanes may have the general formula $(R_2SiO)_n$ where n equals 3 or greater and R represents an organic ligomer such as for example H or $CH_3$. Linear siloxanes may have the formula $R_3$—Si—$(OSiR_2)_n$—O—$SiR_3$ where n equals 0 or greater and R represents an organic ligomer such as for example H or $CH_3$. Examples of cyclic and linear siloxanes and their designations are listed in the table below:

| Cyclic siloxanes | Linear siloxanes |
| --- | --- |
| D3: hexamethylcyclotrisiloxane | L2: hexamethyldisiloxane |
| D4: octamethylcyclotetrasiloxane | L3: octamethyltrisiloxane |
| D5: decamethylcyclopentasiloxane | L4: decamethyltetrasiloxane |

Although not a siloxane, trimethylsilane, $(CH_3)_3SiH$, and trimethylsilanol, $(CH_3)_3SiOH$, are included in this listing, as small amounts of these compounds may be present in process streams associated with landfill and digester gas, referred to herein collectively as biogas. For the purpose of this disclosure, the term "siloxane" refers not only to linear and cyclic siloxanes as presented in the table above, but also includes trimthylsilane and trimethylsilanol.

Sources of Siloxanes:

Siloxanes are used in a variety of industries. For example, siloxanes may be used in the synthesis of high molecular weight poly(dimethylsiloxane) polymers, in personal care products as emollients, and in detergents as anti-foaming agents. Additional applications include dry cleaning, where siloxanes are used as a more environmentally friendly solvent than traditional chlorofluorocarbons. Siloxanes may also be produced by the semiconductor industry as a by-product of etching applications. Trimethylsilane may be used by the semiconductor industry, e.g., as an etchant gas. Due to their widespread use, siloxanes inevitably find their way into landfills and sewage treatment plants.

Waste Streams Containing Siloxanes:

Biogas from landfills and anaerobic digesters may be comprised primarily of $CH_4$ and $CO_2$. Additional compounds present in biogas may include low to moderate molecular weight volatile organic compounds, chlorine and fluorine-containing halocarbons, sulfur compounds (including hydrogen sulfide, $H_2S$) and siloxanes. For example, a typical biogas stream may contain in excess of 50 ppm total siloxane. In addition to the siloxanes, the biogas stream mayl typically be saturated with water vapor, and may contain up to 1% non-methane volatile organic compounds (VOCs) plus up to and in excess of 1,000 ppm of sulfur compounds that may include mercaptans, thiols and $H_2S$. The concentration of $H_2S$ may be in excess of 5000 ppm. It may be desired in many applications to recover and utilize the energy value of biogas as a biomethane fuel to feed on-site generators, for example, for the purpose of power generation.

Need for Siloxane Removal:

The concentration of siloxanes in biogas may be less than a part per million (ppm) to in excess of 50 ppm total siloxane or in excess of 150 ppm total silicon basis. Although the concentration of siloxane may be thought of as low, the effects of siloxanes on downstream process equipment over time may be devastating. This may be due to the fact that siloxanes may undergo thermal oxidation reactions within engines (used to generate power) and thus, may yield microcrystalline silicon dioxide ($SiO_2$) deposits. These deposits may form on the walls of combustion chambers, spark plugs, cylinders, turbine blades, etc., leading to possible abrasion of interior engine parts/components. If the process stream is left untreated, said damage mayl result in frequent engine rebuilds and/or replacement of damaged components. In extreme cases, complete and costly engine overhauls may be required following 6 weeks or less of operation.

Further, as regulations controlling $NO_x$ from point-source emissions become more restrictive, catalytic processes, such selective catalytic reduction, are required to further reduce $NO_x$ emissions from engines. These catalysts may be readily fouled by any silicon dioxide powder that may elute through the engine, or by any unburned siloxanes that may elute through the engine and react with the catalyst to form deposits, e.g., silicon dioxide deposits.

As a result of understanding their (siloxane) detrimental effects on down-stream processes, it has been discovered that siloxane levels in biogas fuel should be substantially reduced to very low levels prior to the process stream being delivered to engines. For example, it has been discovered that the siloxane level, on an elemental silicon basis, should, according to one embodiment of the invention, be reduced to less than 0.5 ppm, preferably to less than 0.05 ppm, and more preferably less than 0.005 ppm.

Siloxane Removal Processes:

Various methods have been proposed to remove siloxanes from the biogas streams. Adsorption-based systems are the most common. These systems utilize either a single-pass non-regenerated adsorbent bed or a regenerable temperature swing adsorption (TSA) or pressure swing adsorption (PSA) process, or a hybrid of the two systems. The TSA system appears to be the preferred process for removal of siloxanes.

Single-pass, non-regenerable adsorption systems are less complex than the regenerable systems, utilizing one or more adsorbent beds through which the biogas is passed. When the adsorbent becomes loaded to its capacity with siloxane, the adsorbent is removed from the system and replaced with fresh adsorbent. These single-pass systems typically use a carbon-based adsorbent, which require frequent change-out due to the presence and subsequent adsorption of additional organic matter, such as, for example, volatile organic compounds plus $H_2O$ and $H_2S$.

The single-pass, non-regenerable systems have operating costs proportional to the amount of siloxanes in the process stream. For process streams containing high siloxane concentrations, the beds require frequent change-out and replacement, which can be expensive and which restricts the application of these systems to all but the low-siloxane level streams. Further, the spent bed may constitute at best "waste" and in lesser cases "hazardous waste," meaning costs associated with disposal may be significant.

TSA regenerable systems, designed to capture siloxanes and subsequently release the siloxanes to a waste stream, are commercially available. Typically, the siloxanes are adsorbed at or near ambient temperature or pressure on a variety of different adsorbent media such as molecular sieves, activated alumina, zeolites, silica, activated carbon, and diatomaceous earth. For the TSA systems, after the adsorbent is saturated with siloxanes, the flow is generally reversed through the adsorbent bed while the bed is heated to a target temperature, which is maintained for a specified period of time in order to desorb the siloxanes. The waste stream may be vented to atmosphere or flared (burnt) along with some of the process gas in order to meet environmental regulations. Once the desorption operation is complete, the bed is cooled, such as for example, by passing lower temperature gas, such as air, nitrogen or biogas through the bed. Once cooled, the bed is again ready to adsorb siloxanes.

An example of a TSA system for siloxane removal is disclosed in U.S. Pat. No. 7,306,652, where alumina or alumina plus silica (also referred to as silicon dioxide) are used to adsorb siloxanes. The saturated adsorbent is regenerated by passing hot air, or biogas at nominally up to 250° F. through the bed. The hot regeneration gas is reported to desorb the siloxanes from the alumina media, which are then directed to a flare. The regeneration stream can include a slip stream of product gas or external streams used to heat and purge the bed. Although the applicants disclose the use of both aluminum oxide (alumina) and silica media to remove siloxanes, the applicants do not disclose any method for minimizing/preventing reactions leading to the polymerization of siloxanes. Furthermore, the applicants fail to disclose any information relating to the life-time or change-out schedule of the adsorbent.

Hayward et al. (WO 2009/092983) disclose a TSA process for removing siloxanes from landfill and digester gas process streams. Said process employs two resins in a layered bed filter configuration, namely Dowex Optipore V503 resin and an Amberlite XAD4. The purpose of the Dowex Optipore V503 is to remove D3 and D4 siloxanes, while the purpose of the Amberlite XAD4 is to remove the D5 siloxane. Again, the applicants do not disclose any method for minimizing or preventing reactions leading to the polymerization of siloxanes. The applicants also fail to report any information relating to the life-time or change-out schedule of the adsorbent.

Reactions Involving Siloxanes:

Siloxanes are a reactive species that can polymerize and accumulate on an adsorbent over time. For regenerable TSA processes, this may result in reduced siloxane removal performance and the necessity for adsorbent change-outs, thus significantly increasing the life-cycle cost of a siloxane removal plant. Depending upon the characteristics of the biogas feed stream and the siloxane concentrations, many commercial TSA adsorbent beds require replacement up to every 2 to 3 months. To promote longer adsorbent bed life, it has been discovered that it is necessary to minimize the accumulation of siloxanes, siloxane byproducts, and contaminants on the adsorbent.

Siloxanes are known to undergo both acid and base catalyzed polymerization reactions. In the case of D4 siloxane, while not wishing to be bound by any particular theory, the catalyzed acid-catalyzed polymerization reaction may be expected to proceed as follows:

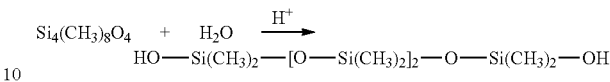

The above reaction is a ring-opening reaction leading to the hydrolysis product. The hydrolysis product further reacts with the siloxane to yield the polymerized product, which may further polymerize:

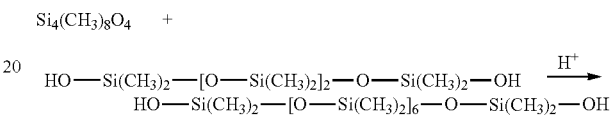

In another reaction, siloxanes may react with alkali salts to form siloxide salts. For example, hexamethyldisiloxane (L2-$((CH_3)_3Si)_2O$) may react with sodium hydroxide according to:

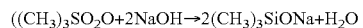

The impact of the above reactions (both polymerization and siloxide salt formation) may be to accumulate high molecular weight compounds and solids within the pores of the adsorbent media employed by the TSA process. The result of said accumulation will be a degradation of the process performance, culminating in costly change-out and replacement of the adsorbent media.

Hydrogen sulfide, $H_2S$, may be a contaminant present in biogas that also has the potential to undergo reactions with the surface of adsorption media leading to the formation of elemental sulfur and $SO_2$. While not wishing to be bound by any theory, $H_2S$ may undergo oxidation reactions with oxidation sites associated with adsorbent media according to:

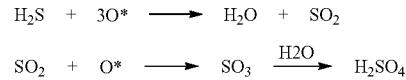

From the above reaction scheme, $H_2S$ may react with surface oxygen to yield water and $SO_2$. $SO_2$ may be further oxidized to $SO_3$, which when combined with adsorbed water may yield sulfuric acid, $H_2SO_4$. As siloxanes may undergo acid catalyzed hydrolysis reactions (as described previously), it is, according to one embodiment of the invention, preferable to minimize or eliminate the above reaction. Otherwise, a small amount of oxidation activity may lead to the formation of sulfuric acid, which may lead to the undesired catalyzed polymerization of siloxanes, thereby degrading the media.

The $SO_2$ may also react with $H_2S$ as shown below to yield elemental sulfur, which may accumulate on the adsorbent, reducing the adsorbent potential for siloxane.

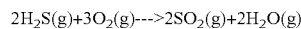

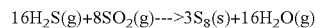

According to one embodiment of the present invention, said reactions are preferably minimized.

Heating the media to desorb siloxanes (such as during the regeneration step of a TSA process) will increase the polymerization reaction rates, further promoting accumulation of adsorbed species in the pores of the adsorbent. According to the one embodiment of the present invention, care should therefore be taken in selecting the adsorbent media so that said reactions do not occur at an appreciable rate, either during the adsorption stage or during thermal regeneration of the adsorbent bed. Further, it has been discovered that both adsorption and desorption (i.e. regeneration) temperatures must remain relatively low to avoid the undesirable polymerization reactions, as reaction rates increase exponentially with temperature.

Desired Adsorbent Media Properties:

Many commercial adsorbents, including but not limited to activated carbon, silicon dioxide (often referred to as silica), aluminum oxide (alumina) and zeolite molecular sieves (zeolites), have surfaces which are either acidic, alkaline, oxidative, or contain residual alkali, or a combination of the aforementioned. In certain cases, such as for example activated carbon, aluminum oxides and zeolites, acid-base pairs may be present. Using carbon as an example, during the activation process, functional groups are resident on the surface of carbon. Examples of functional groups associated with the surface of activated carbon may include hydroxides, carboxylic acids, ethers and carbonyls. Depending on the method of activation, the carbon is typically acidic or basic. Activation procedures associated with coal and coconut-based carbons typically yield basic media. Activation procedures associated with wood-based carbons typically yield acidic media.

In the case of aluminum oxides and silica-aluminates, the surfaces tend to have both acid-base pairs. According to one embodiment of the present invention, it has been discovered that both types of sites have the potential to facilitate reactions involving siloxanes. Many silicas are prepared from sodium silicate and therefore contain residual sodium. According to one embodiment of the the present invention, it has been discovered that the residual sodium has the potential to facilitate reactions leading to the formation of siloxide salt. Further, defects are associated with the structure of silicon dioxide. Said defects are often terminated with basic hydroxyl groups, which have the potential to facilitate reactions leading to the polymerization of siloxanes.

Zeolites are another class of adsorbents often employed in separation processes. Zeolites are comprised of a crystalline silica-alumina structure, with sodium being the typical charge-balancing cation present within the pore structure. According to one embodiment of the the present invention, it has been discovered that the sodium has the potential to facilitate reaction leading to the formation of siloxide salts. Zeolites also have defects in the crystalline structure, which may bring about either acidic or basic sites.

From the above examples, according to one embodiment of the the present invention, it has been discovered that the use of commercial adsorbents with acidic or basic surfaces will have the potential to facilitate unwanted siloxane polymerization and/or siloxide salt formation reactions during the TSA siloxane removal processes.

In addition to minimizing reactions involving siloxanes, according to one embodiment of the the present invention, it has been discovered that care should also be taken when selecting adsorbents such that acid gases do not accumulate on the adsorbent, or that acids are not formed on the adsorbent. Otherwise, acording to one embodiment of the the present invention, it has been discovered that acid-catalyzed polymerization reactions involving siloxanes may occur at an increased rate as the number of acid sites increases over time. As discussed earlier, $H_2S$, a significant contaminant associated with biogas, may undergo oxidation reactions with surface oxygen associated with activated carbon leading to the formation of sulfate, which, when combined with water will yield sulfuric acid. According to one embodiment of the present invention, it has been discovered that sulfuric acid has the potential to readily facilitate polymerization reactions involving siloxanes.

SUMMARY OF THE INVENTION

The present invention relates to a process for removing siloxanes from biogas process streams using an adsorbent media with an inert surface. According to an embodiment of the inventive process described herein, the biogas may be passed through a bed containing adsorbent(s). Siloxane contaminants in the process stream are adsorbed onto the adsorbent(s). When an adsorbent becomes saturated with siloxanes, as evidenced by siloxanes being present above threshold values in the effluent stream, the adsorbent may be regenerated by heating the adsorbent preferably in the presence of flowing regeneration gas to remove the adsorbed siloxanes. Regeneration gas may include, but is not be limited to, ambient air, clean dry air (CDA), product biomethane, $N_2$, or biogas. In systems containing two or more adsorbents, one can be used to remove siloxanes from biogas while another adsorbent is being regenerated.

According to one embodiment of the present invention, the adsorbent employed by the process preferably possesses an inert or near inert surface sufficient to prevent/minimize reactions leading to the polymerization or otherwise accumulation of silicon-containing compounds within its pores. Use of said adsorbent in the novel process, as will be shown in examples contained herein, allows for an extended adsorbent life-span.

According to one embodiment, the present invention is directed to an improved process for removing siloxanes from a biogas feed (for example, from a landfill, digester, or sewage treatment plant) comprising contacting a gas feed with an adsorbent, e.g., passing it through a bed, comprising an adsorbent having an inert surface or near inert surface to adsorb onto the adsorbent at least a portion of the siloxanes in the gas feed, and optionally regenerating the adsorbent by removing at least a portion of the siloxanes adsorbed on the adsorbent.

According to one embodiment, the present invention is directed to an improved process for removing siloxanes from a gas comprising contacting the gas with an adsorbent, preferably passing it through an adsorbent bed, wherein the adsorbent comprises silicon dioxide, aluminum dioxide, silica-aluminum dioxide, zeolite, and/or a metal oxide and mixtures thereof. Preferably, according to oen embodiment, the adsorbent comprises Grades 59 and 127 silicon dioxide and mixtures thereof. In a preferred embodiment, the adsorbent comprises layers of adsorbent, for example, preferably layers of one or more grades of silicon dioxides. According to a further embodiment, the present invention is directed to the above-described removal process wherein the adsorbent comprises at least two particle sizes.

According to some embodiments, the present invention is directed to a siloxane removal process wherein contacting the gas with the adsorbent reduces the siloxane level, on an elemental silicon basis, to less than 0.5 ppm, preferably to less than 0.05 ppm, and most preferably to less than 0.005 ppm.

According to a further embodiment, the present invention is directed siloxane removal process further comprising a prior step, wherein the surface of the adsorbent is rendered inert via a calcination step prior to contacting the gas with the adsorbent, for example, passing the gas feed through an adsorbent bed or beds. Preferably, according to one embodiment, the adsorbent is calcined at temperatures of about 500 C to about 850 C. The adsorbent may preferably be calcined in a humid air environment.

According to a further embodiment, the present invention is directed to a removal process including regenerating the adsorbent, wherein regenerating comprises heating the adsorbent to a temperature of about 80 C to about 200 C. Preferably, according to one embodiment, regenerating removes at least about 95% of the siloxanes from the adsorbent, preferably greater than 97% of the siloxanes.

DETAILED DESCRIPTION OF THE INVENTION

According to one embodiment, the present invention relates to processes for the removal of siloxanes from contaminated biogas process streams using inventive TSA processes, which incorporate an adsorbent or multiple adsorbents with surfaces that are or have been rendered inert accrodong the the present invention. Reference herein to "surface," means not only the external (geometric) surface of the adsorbent particle, but also the internal pore structure. According to one embodiment of the the present invention, it has been discovered that an inert surface is necessary to (1) minimize reactions leading to polymerization and/or siloxide salt formation and, (2) prolong the life of the adsorbent employed in a TSA process.

Process Description:

According to one embodiment of the present invention, a TSA process, in its simplest form, may be comprised of a single adsorbent bed containing media with an inert surface according to the present invention that is capable of adsorbing the target siloxane. When the biogas flow enters the bed, the process stream contacts the adsorbent media, which facilitates the removal of the contaminant, e.g., via physical adsorption phenomena. This operation may be referred to as the adsorption cycle. Once the media nears saturation with the contaminant, flow of the process gas is typically halted. At this point in time, the bed is brought off-line and regenerated under purge flow. This operation may be referred to as regeneration or the regeneration cycle. Said purge flow (or regeneration gas, as it is often referred) may be either co-current or counter-current, with counter-current flow typically being preferred. A suitable regeneration gas may be any gas that allows for the removal of contaminants on the adsorbent media that does not lead to degradation of the media. Regeneration gas may include, but is not be limited to, ambient air, CDA, product biomethane, $N_2$, or biogas. The purge flow may be heated to accelerate desorption of the contaminant. Upon complete or near complete desorption of the contaminant, the adsorbent bed may be cooled to its initial temperature, typically under flowing regeneration gas, although flow may not be necessary. Once at or near the adsorption operating temperature, process gas may again be reintroduced to the regenerated adsorbent bed.

Typically, two or more adsorbent beds may be employed in the TSA process. In this manner, one adsorbent bed may be charged with process gas for purification while the other adsorbent bed(s) are regenerated. In cases where long regeneration cycle times are required (relative to the adsorption cycle time) to remove the contaminant from the media to an acceptable level, three or more adsorbent beds may be employed.

The amount of media employed by the novel process may vary depending on the application. Preferably, according to one embodiment of the present invention, the amount of media should be sufficient to yield a residence time between 0.2 seconds and 5 seconds, and more preferably a residence time between 0.2 seconds and 1 second. According to one embodiment of the present invention, the bed may be sized for superficial gas velocities of 5 to 30 cm/sec, with 15-20 cm/sec being more standard. According to an embodiment of the present invention, pressure drop through the bed may typically be from 2 to about 25 millibars. The bed design may be of several configurations, including a packed bed, radial flow configuration, fluidized bed and/or packed trays. In addition, media may be immobilized in webbing.

Temperatures employed in a TSA process during the adsorption cycle may vary widely. Generally, adsorption is typically favored at low temperatures, and thus, according to one embodiment of the present invention, it has been discovered that it is desirable to operate at the lowest adsorption temperature as possible. Further, according to one embodiment of the present invention, it has been discovered that reaction rates typically decrease exponentially with temperature, making it preferable to operate the adsorption step at low temperatures to minimize reaction rates (polymerization). According to one embodiment of the present invention, it is preferred that the adsorption temperature range from about 0° C. to about 100° C., and more preferably range from ambient temperature to about 60° C. Biogas streams are typically on the order of 25-45° C. and typically saturated with water. In this instance, according to one embodiment of the present invention, the process stream may be heated from about 3° C. to about 15° C. above the feed gas temperature in order to reduce the relative humidity of the process steam and thereby reduce the amount of water adsorbed by the media present in the adsorbent bed. In some instances, according to one embodiment of the present invention, it has been discovered that chilling the gas to condense water, then reheating the gas may be preferable.

Heating the bed or the regeneration gas may be accomplished using electric in-line heaters or gas-fired burners. According to one embodiment of the present invention, heating may be either direct or indirect, with direct heating being preferred. Heat exchangers may be employed to enhance thermal efficiency.

According to one embodiment of the present invention, the regeneration temperature is often selected based upon the time allotted to bring the adsorbent bed back into service. However, according to one embodiment of the novel processes described herein, the regeneration temperature may also be low enough such that undesired polymerization reactions do not occur or are minimized. According to another embodiment of the present invention, it has been discovered that other factors influencing the regeneration temperature include, for example, the adsorption strength of the contaminant, the thermal limits of the adsorbent media, the explosion/flammability limits of the contaminant, and the vessel construction material (plastics may be employed should low enough regeneration temperatures be feasible).

According to one embodiment of the present invention, the desorption temperature may be sufficient to remove all or nearly all of the siloxane retained on the media during the adsorption cycle within the cycle time of the adsorption step.

Due to any polymerization reactions involving siloxanes, according to one embodiment of the present invention, preferably the desorption temperature is as low as possible such as for example ranging from about 70° C. to about 350° C., and more preferably from about 70° C. to about 200° C., and still more preferably from about 70° C. to about 150° C. According to one embodiment of the present invention, the desorption temperature may depend on the nature of the adsorbent media, such as for example pore size and pore size distribution, particle size, and presence of residual contaminants in the process stream.

According to one embodiment of the present invention, regeneration gas may be any gas that facilitates the removal of siloxanes and other contaminants from the adsorbent media in a manner that does not degrade the media. Preferred examples of regeneration gases include air, CDA, $N_2$, and/or product biomethane. The flow rate of the regeneration gas may be equivalent to that of the feed gas; however, for economic reasons, the regeneration gas flow rate may be significantly less than that of the product gas flow rate, such as for example 25% or less.

The desorption stream may be vented to atmosphere; however, regulations may require that the waste stream be delivered to a flare or similar to decompose the contaminants.

Description of Adsorbent Media:

According to a preferred embodiment of the present invention, the adsorbent used to adsorb siloxanes in the process disclosed herein minimizes or eliminates reactions leading to the formation of polymerization products and/or siloxide salts. According to a further embodiment of the the present invention, the media preferably does not significantly degrade $H_2S$ and other sulfur compounds, which may either accumulate in the pores of the adsorbent media or promote unwanted acid-based polymerization of siloxanes.

According to a preferred embodiment of the present invention, the novel process described herein employs an adsorbent media having an inert surface. As used herein, an "inert surface" means a surface substantially free or nearly free of acidic, alkaline or oxidative sites, and containing no more than trace levels of alkali metals.

According to one embodiment of the present invention, an inert surface may be readily identified by depositing liquid siloxane directly onto the media. After allowing the siloxane to stand on the media for a discrete period of time, the excess siloxane may be extracted from the pores of the media using an inert solvent, such as methanol. The inertness of the surface may then be assessed by analyzing the solvent for siloxane. If the amount of siloxane in the solvent is consistent with the amount of siloxane initially applied to the media, the media may be deemed to have an inert surface. Otherwise, the amount of siloxane in the solvent will be less than that initially added to the media. The "lost" or "missing" siloxane is assumed to be present within the pores of the media, having undergone polymerization reactions and/or siloxide salt formation reactions. Said material will prove unreliable in the inventive processes described herein for the removal of siloxanes.

According to another embodiment of the present invention, an inert surface may also be identified by assessing water adsorption of the media. Water adsorption may occur by hydration of functional groups associated with a surface. Once the functional groups become fully hydrated, the surface becomes highly hydrophilic, and water may rapidly fill the pores of the media. According to an embodiment of the present invention, an inert surface will have a minimal number of functional groups and will thus be hydrophobic, adsorbing only small amounts of water, e.g., at moderate to high levels of relative humidity (RH).

Metal Oxides:

According to some embodiments of the present invention, metal oxide base adsorbents, such as porous silicon dioxide ($SiO_2$—referred to as silica), aluminum oxide ($Al_2O_3$) and silica-aluminum oxides, may be employed in the processes described herein for a range of applications. Silicon dioxide is often prepared using sodium silicate and therefore may contain residual sodium. According to an embodiment of the present invention, said sodium is preferably washed from the $SiO_2$ to render trace levels. Otherwise, according to an embodiment of the present invention, it has been discovered that reactions leading to the formation of the siloxide salt may occur. Washing to remove residual sodium may include passing DI water over the silica and monitoring the dissolved solid content of the wash stream, terminating the washing when the solid content drops below a target threshold, such as for example below 25 parts per million. The wash water may also be mildly acidic.

According to one embodiment of the present invention, it has been discovered that metal oxide based adsorbents, such as silicon dioxide and aluminum oxide, also contain terminal hydroxyl groups and other defects in the structure that may provide reactive sites for siloxanes. According to an embodiment of the present invention, said groups may be rendered inert by heating the metal oxide in air at a temperature of about 300° C. to about 900° C. As said thermal treatment will decrease the porosity of the metal oxide and the corresponding adsorption capacity, according to a preferred embodiment of the present invention, the metal oxide may be treated at the minimum temperature required to achieve a threshold level of surface inertness. Although the thermal treatment will reduce the porosity of the metal oxide, reactions leading to the polymerization of siloxanes will be diminished, allowing for efficient desorption of siloxanes during regeneration.

According to one embodiment of the present invention, it has been discovered that the effects of thermal treatment on adsorbent porosity may be minimized by incorporating structural promoters into the adsorbent, such as for example by impregnation of the metal oxide with lanthanum.

According to one embodiment of the present invention, one technique for assessing the inertness of the surface involves adding siloxane directly to the media, allowing the siloxane-contaminated media to stand for a discrete period of time (nominally 2 to 4 hours), then extracting the unreacted siloxane from the media using a solvent, such as methanol. The extraction solvent may then be analyzed for siloxane, and the reactivity of the media may be determined by comparing the amount of siloxane in the solvent to the amount of siloxane initially added to the media. According to one embodiment of the present invention, media may be considered inert if the siloxane conversion (amount lost) is less than 5% and preferably less than 1%.

According to one embodiment of the present invention, it has been discovered that an added benefit of the high temperature thermal treatment is a reduction in the amount of water the material will physically adsorb. A reduction in water adsorption reduces the energy required to re-generate the adsorption bed in the process described herein, as desorption of water from the media requires energy input. While not wishing to be bound by any science, water adsorption is believed to occur first via hydration of functional surface groups, as these groups are hydrophilic in nature. Once the functional groups are fully hydrated, the surface becomes highly hydrophobic, and water begins to adsorb rapidly within the pores. The reduction in water adsorption may be a direct indication that the surface of the silicon dioxide has been dehydroxylated and that the presence of reactive functional groups has been minimized. According to one embodiment of the present invention, a surface may be considered inert when the amount of adsorbed water is less than 5% of its mass at an RH value of 80%.

Zeolites:

Zeolites are crystalline aluminosilicates that can be synthesized over a wide range of compositions and $SiO_2/Al_2O_3$ ratios. Zeolites can be acidic, basic (Simon et al. *Microporous and Mesoporous Materials* 68 (2004) 143; Kovacheva et al. *Reaction Kinetics Catalysis Letters* 79 (2003) 149), or both. The acidic or basic nature of the zeolite framework is known to be a function of the Si/Al ratio, the charge balancing cation and the presence (or absence) of basic oxides accumulated within the pores of the zeolite. Further, crystalline, zeolites contain defect sites, such as silanol groups. According to one embodiment of the present invention, it has been discovered that said sites have the potential to promote unwanted polymerization reactions involving siloxanes, thereby decreasing the effectiveness of removal processes overtime leading to pre-mature change-out of beds.

According to one embodiment of the present invention, surface inertness of selected zeolites, such as for example zeolite Y and zeolite beta, may be greatly enhanced by first exposing the zeolite to air with a water content of about 5% to about 50% at temperatures of about 450° C. to about 700° C. Following exposure to the stream, the zeolite may then be exposed to dry air or dry $N_2$ at temperatures of about 500° C. to about 900° C. Upon completion of the thermal processes, the zeolite may be washed extensively in DI water to remove any occluded cations until the total dissolved solids of the wash water is below about 25 ppm. While not wishing to be bound by any particular theory, the steam treatment of the zeolite destabilizes the structure, forming hydroxyl groups associated with both silicon and aluminum atoms in the zeolite framework. Said treatment also removes aluminum (a source of acidity) from the lattice of the zeolite. The high temperature thermal treatment then dehydroxylates the surface, thereby removing the hydroxyl groups.

According to embodiments of the present invention, the media may be carbon, metal oxide and/or zeolite, and/or mixtures thereof, provided that the media possesses an inert surface as defined herein or is pretreated using methods described herein to render the surface inert. In a preferred embodiment, the media employed by the processes described herein is silicon dioxide. In a more preferred embodiment, the media employed by the process described herein may be comprised of a layer of silicon dioxide that may target removal of cyclic siloxanes followed by one or more layers of silicon dioxide and/or zeolite which may target the removal of linear siloxanes, trimethylsilane and trimethylsilanol.

According to one embodiment of the present invention, the media employed by the novel processes may be in the form of beads, granules, extrudates, etc. Alternatively, the media may be coated on the walls of a monolith. The particle size of the media may be, depending upon the application, an important design consideration. As the boiling point of many siloxanes is significantly greater than ambient temperatures, siloxanes may be considered condensable vapors rather than gases. According to one embodiment of the present invention, it has been discovered that as condensable vapors, siloxanes may rapidly adsorb into pore mouths, slowly wicking their way into the internals of the particle. As a result, maximizing the geometric surface area of the particles may become important to the design of the removal process. Therefore, according to a preferred embodiment of the present invention, the processes described herein preferably employ as small of adsorbent particle as possible, such as for example 6×10 mesh, and more preferably 12×30 mesh, and even more preferably 20×40 mesh particles. According to one embodiment of the present invention, e.g., utilizing a layered bed, the layers may incorporate particles of various sizes as desired.

According to one embodiment of the present invention, it is preferable to minimize particle size, however, it has been discovered that pressure drop through the process may become an issue, as may fluidization of the adsorbent bed. According to one embodiment of the present invention, pressure drop may be minimized by loading the media into a radial flow bed. Said bed may be annular in design, with a thickness ranging from as little as less than about 1 inch to greater than on the order of about 12 inches. Said bed in its simplest form may be comprised of two annular screens separated by the difference in radius and sealed at both ends. Adsorbent media of a fine mesh size is then loaded into the annular space and may be sealed. According to one embodiment of the present invention for said configuration, it is preferable that flow enter the radial flow bed through the center and exit through the outer diameter. Said configuration may also be used with layered beds. The layered bed configuration may be comprised, e.g., of two or more annular rings filled with adsorbent media.

According to a further embodiment of the present invention, pressure drop may be minimized by locating the adsorbent media on structures, for example, thin trays, e.g., square or rectangular trays or cartridges, of varying width and height with the depth of the media in the structures or trays, e.g., being on the order of less than about 1 inch to greater than on the order of about 12 inches. The biogas flow may then be directed, e.g., in parallel, through a series of such trays or structures. Said configuration may also be used with layered beds involving two or more adsorbent media comprising particles of one or more sizes.

Example 1

The purpose of this example is to illustrate the effects of pre-treating silicon dioxide ($SiO_2$) on the corresponding physical properties and siloxane reactivity. A large pore $SiO_2$ obtained from WR Grace (product Grade 59) was crushed and sieved to 12×30 mesh granules. The media was evaluated as-received, then following calcinations at 400° C. for 12 hours and following calcinations at 500° C. for 12 hours. The table below reports the surface area, pore volume and water pick-up (at 90% relative humidity) of the Grade 59 silica as-prepared and following calcinations at 500° C. and following calcinations at 750° C.

| Material | Surface Area | Pore Volume | $H_2O$ Pick-up |
| --- | --- | --- | --- |
| As-Received | 247 $m^2/g$ | 1.11 $cm^3/g$ | 0.194 g/g |
| Calcined 400° C. | 243 $m^2/g$ | 1.12 $cm^3/g$ | 0.048 g/g |
| Calcined 500° C. | 208 $m^2/g$ | 0.83 $cm^3/g$ | 0.016 g/g |

A medium pore silica obtained from WR Grace (product Grade 127) was evaluated as-received, then following calcinations at 500° C. for 12 hours and following calcinations at 750° C. for 12 hours. The table below reports the surface area, pore volume and water pick-up (at 90% relative humidity) of the Grade 59 silica as-prepared and following calcinations at 500° C. and following calcinations at 750° C.

| Material | Surface Area | Pore Volume | $H_2O$ Pick-up |
| --- | --- | --- | --- |
| As-Received | 744 $m^2/g$ | 0.40 $cm^3/g$ | 0.345 g/g |
| Calcined 500° C. | 639 $m^2/g$ | 0.34 $cm^3/g$ | 0.154 g/g |
| Calcined 750° C. | 341 $m^2/g$ | 0.19 $cm^3/g$ | 0.028 g/g |

Siloxane reactivity was evaluated by depositing 150 mg of each silica sample into a 10 dram vial. To each silica sample in the vials was added 75 mg of liquid D4 siloxane via about 5-8 μl droplets. The contents of the vials were mixed using a spatula. The vials were capped and placed in a water bath at 25° C. for 4 hours. Following 4 hours, the vials were removed from the water bath. To each vial was added 10 ml of methanol. The vials were agitated for 15 minutes on a wrist shaker for the purpose of extracting any unreacted siloxane from the pores of the silica samples. The solutions were then evaluated for residual D4 siloxane using a gas chromatograph. Note, all materials were crushed and sieved to less than 200 mesh powder prior to testing. The table below reports the conversion of D4 siloxane achieved for each sample.

| Calcination Temperature | D4 Conversion for Grade 59 Silica | D4 conversion for Grade 127 Silica |
| --- | --- | --- |
| As-Received | 6.2% | 67.1% |
| Calcined 400° C. | Less than 3% | No test |
| Calcined 500° C. | Less than 3% | 16.8% |
| Calcined 750° C. | No test | Less than 3% |

Results demonstrate that the as-received Grade 59 silica is nearly inert to siloxane and may require only modest thermal treatment. The as-received Grade 127 silica is not inert and must therefore be treated. Results demonstrate that while calcining the Grade 127 silica decreases the surface area and pore volume, the resulting material is far less reactive towards the polymerization of D4 siloxane. In addition, water adsorption is greatly reduced.

Example 2

This example illustrates the effectiveness of the Grade 59 silica (inert surface) to remove D4 siloxane in a TSA process. 21 $cm^3$ of 12×30 mesh Grade 59 silica calcined at 400° C. were loaded into a 3 cm diameter test cell and exposed to 100 ppm D4 siloxane plus 200 ppm $H_2S$ in humid air (5.5% $H_2O$) at 50° C. and a residence time of 0.5 seconds. The effluent concentration of siloxane was monitored continuously using a gas chromatograph throughout the duration of the run. D4 siloxane was not present in the effluent stream until 70 minutes into the run. The feed was terminated following 2.5 hours, at which time, the effluent concentration of D4 siloxane was approximately 50% of the feed. The bed was then heated to 90° C. in 1 hours (rate=40° C./hr) under flowing, humid air, with the final temperature maintained for 2 hours. The bed was cooled to 50° C. and the cycle was repeated a total of 10 times. Upon completion of the $10^{th}$ cycle, the time in which D4 siloxane was first detected in the effluent stream remained unchanged at 70 minutes, indicating no degradation in the adsorption capacity of the media. Over the course of the 10 cycles, the material balance on D4 siloxane was 99.1%, indicating that to within experimental error, little if any D4 siloxane was retained on the silica. Upon completion of the cycle, the Grade 59 silica was removed and evaluated for porosity using $N_2$ adsorption. The surface area of the material increased slightly from 247 $m^2/g$ to 257 $m^2/g$, indicating no significant accumulation of siloxane accumulation within the pores of the material.

Results indicate that the inert surface of the Grade 59 silica calcined at 400° C. is able to effectively remove D4 siloxane in a TSA process.

Example 3

This example illustrates the effectiveness of the inert surface Grade 59 silica to remove D5 siloxane in a TSA process. 21 $cm^3$ of 12×30 mesh Grade 59 silica calcined at 400° C. were loaded into a 3 cm diameter test cell and exposed to 60 ppm D5 siloxane plus 200 ppm $H_2S$ in humid air (5.5% $H_2O$) at 50° C. and a residence time of 0.5 seconds. The effluent concentration of siloxane was monitored continuously using a gas chromatograph throughout the duration of the run. D5 siloxane was not present in the effluent stream until 2 hours into the run. The feed was terminated following 2.5 hours, at which time, the effluent concentration of D5 siloxane was approximately 5% of the feed. The bed was then heated to 90° C. in 1 hours (rate=40° C./hr) under flowing, humid air, with the final temperature maintained for 2 hours. The bed was cooled to 50° C. and the cycle was repeated a total of 10 times. Upon completion of the $10^{th}$ cycle, the time in which D5 siloxane was first detected in the effluent stream remained unchanged at 2 hours, indicating no degradation in the D5 adsorption capacity of the media. Over the course of the 10 cycles, the material balance on D5 siloxane was 96.5%, indicating that to within experimental error that little if any D5 siloxane was retained on the silica.

Results indicate that the inert surface Grade 59 silica calcined at 400° C. is able to effectively remove D5 siloxane in a TSA process.

Example 4

This example illustrates the effects of the thermal treatment on rendering the surface of Grade 127 silica inert on its effectiveness in a TSA process. 21 $cm^3$ of as-received 12×30 mesh Grade 127 silica were loaded into a 3 cm diameter test cell and exposed to 125 ppm L3 siloxane plus 200 ppm $H_2S$ in humid air (5.5% $H_2O$) at 50° C. and a residence time of 0.4 seconds. The effluent concentration of siloxane was monitored continuously using a gas chromatograph throughout the duration of the run. L3 siloxane was not present in the effluent stream until 6.5 hours into the run. The feed was terminated following 11 hours, at which time, the effluent concentration of L3 siloxane was approximately 35% of the feed. The bed was then heated to 140° C. in 1 hour (rate=90° C./hr) under flowing, humid air, with the final temperature maintained for 15 hours. At this time, no L3 siloxane was detected in the effluent stream. The material balance on L3 siloxane was 82%. Said result indicates that a portion of the L3 siloxane remains associated with the media.

Following this, 21 $cm^3$ of 12×30 mesh Grade 127 silica calcined at 750° C. were loaded into a 3 cm diameter test cell and exposed to 125 ppm L3 siloxane plus 200 ppm $H_2S$ in humid air (5.5% $H_2O$) at 50° C. and a residence time of 0.4 seconds. The effluent concentration of siloxane was monitored continuously using a gas chromatograph throughout the duration of the run. L3 siloxane was not present in the effluent stream until 3 hours into the run. The feed was terminated following 5 hours, at which time, the effluent concentration of L3 siloxane was approximately 10% of the feed. The bed was then heated to 140° C. in 1 hours (rate=90° C./hr) under flowing, humid air, with the final temperature maintained for 4 hours. At this point in time, the effluent concentration of L3 siloxane was less than 5 ppm. The bed was cooled to 50° C. and the cycle was repeated a total of 6 times. Upon completion of the 6$^{th}$ cycle, the time in which L3 siloxane was first detected in the effluent stream remained unchanged at 3 hours, indicating no degradation in the adsorption capacity of the media. Over the course of the 6 cycles, the material balance on L3 siloxane was 103%, indicating that to within experimental error, little if any L3 siloxane was retained on the silica. Upon completion of the cycle, the used Grade 127 silica (calcined at 750° C.) was removed and evaluated for porosity using $N_2$ adsorption. The surface area of the material decreased slightly from 341 m$^2$/g to 329 m$^2$/g, indicating no significant accumulation of siloxane accumulation within the pores of the material.

Results indicate that thermally treating the Grade 127 silica to render the surface inert greatly minimizes/eliminates accumulation of siloxane within the pores of the media.

Example 5

The purpose of this example is to illustrate the effects of pre-treating zeolites ($SiO_2$) on the corresponding siloxane reactivity. Zeolites beta and Y were obtained from UOP as powders and evaluated for siloxane reactivity as described previously. The zeolites were then calcined in 10% $H_2O$ vapor/air at 550° C. for 6 hours, followed by calcinations in air at 800° C. for 6 hours. The table below illustrates the effects of the pretreatment on rendering the surface of the zeolite inert. Siloxane reactivity was evaluated as described in Example 1.

| Material | D4 Conversion for Zeolite Beta | D4 Conversion for Zeolite Y |
|---|---|---|
| As-Received | 85% | 8.5% |
| Treated | 21% | Less than 3% |

Results demonstrate that the treatment greatly reduced the siloxane reactivity of the zeolites, with zeolite Y being considered viable for the treatment of siloxanes.

Example 6

This example illustrates the effects of the thermal treatment on rendering the surface of zeolite beta inert on its effectiveness in a TSA process. As-received zeolite beta was prepared as 12×30 mesh granules by first forming the granules into tablets using a tabletting machine, then crushing and sieving the tablets to 12×30 mesh granules. 21 cm$^3$ of as-received 12×30 mesh zeolite beta granules were loaded into a 3 cm diameter test cell and exposed to 125 ppm L3 siloxane plus 200 ppm $H_2S$ in humid air (5.5% $H_2O$) at 50° C. and a residence time of 0.4 seconds. The effluent concentration of siloxane was monitored continuously using a gas chromatograph throughout the duration of the run. L3 siloxane was not present in the effluent stream until about 7 hours into the run. The feed was terminated following 10 hours, at which time, the effluent concentration of L3 siloxane was approximately 25% of the feed. The bed was then heated to 200° C. in 2 hour (rate=75° C./hr) under flowing, humid air, with the final temperature maintained for 15 hours. At this time, no L3 siloxane was detected in the effluent stream. The material balance on L3 siloxane was only 41%. Said result indicates that a significant portion of the L3 siloxane remained associated with the media and was not removed during thermal desorption.

Zeolite beta, calcined at 750° C. as in Example 5, was prepared as 12×30 mesh granules by first forming the granules into tablets using a tabletting machine, then crushing and sieving the tablets to 12×30 mesh granules. 21 cm$^3$ of the treated zeolite beta were loaded into a 3 cm diameter test cell and exposed to 125 ppm L3 siloxane plus 200 ppm $H_2S$ in humid air (5.5% $H_2O$) at 50° C. and a residence time of 0.4 seconds. The effluent concentration of siloxane was monitored continuously using a gas chromatograph throughout the duration of the run. L3 siloxane was not present in the effluent stream until about 5.5 hours into the run. The feed was terminated following 7 hours, at which time, the effluent concentration of L3 siloxane was approximately 35% of the feed. The bed was then heated to 200° C. in 2 hours (rate=75° C./hr) under flowing, humid air, with the final temperature maintained for 14 hours. At this point in time, the effluent concentration of L3 siloxane was less than 2 ppm. The material balance on L3 siloxane was 84%. Said result indicates that although a portion of the L3 siloxane remains associated with the media, treating the media as described in Example 5 greatly reduced the amount of L3 siloxane retained in the pore structure as compared to as-received media.

Example 7

This example illustrates the effectiveness of a layered bed TSA process comprising adsorbent with an inert surface in removing siloxanes. 42 cm$^3$ of as-received 12×30 mesh Grade 59 silica (inlet) and 42 cm$^3$ of Grade 127 silica calcined at 750° C. (outlet) were loaded into a 3 cm diameter test cell and exposed to 25 ppm D4 siloxane, 25 ppm D5 siloxane, 10 ppm L3 siloxane, 10 ppm trimethylsilane plus 200 ppm $H_2S$ in humid air (5.5% $H_2O$) at 50° C. The residence time for the entire bed was 1.6 seconds. Every 6 hours, the feed was discontinued and the bed was regenerated by heating to 140° C. in 1 hour, with the final temperature maintained for 4 hours. The bed was then cooled to 50° C. in 1 hour, at which time, the flow of process gas was again initiated. The regeneration gas employed by the process was air, with the flow rate of the regeneration gas selected as one-third that of the feed. Regeneration was counter-current to that of the feed gas.

During operation, both the feed gas and effluent gas were monitored for the presence of siloxane. The process was operated for 45 days for a total of 90 adsorption-regeneration cycles. At no time was siloxane present in the product stream. Material balances associated with each cycle yielded typically greater than 95% recovery (silicon basis); while the overall material balance for the duration of the process was calculated to be 98.4%.

What is claimed is:
1. An improved process for removing siloxanes from a biogas feed comprising:
passing a gas feed through an adsorbent bed comprising an adsorbent having an inert surface to adsorb onto the adsorbent at least a portion of the siloxanes in the gas feed; and regenerating the adsorbent by removing siloxanes adsorbed on the adsorbent.

2. The process of claim 1, wherein the adsorbent comprises silicon dioxide.

3. The process of claim 1, wherein the adsorbent comprises aluminum dioxide.

4. The process of claim 1, wherein the adsorbent comprises silica-aluminum dioxide.

5. The process of claim 1, wherein the adsorbent comprises zeolite.

6. The process of claim 1, wherein the adsorbent comprises metal oxide.

7. The process of claim 1, wherein the adsorbent bed comprises an adsorbent mixture.

8. The process of claim 1, wherein the adsorbent bed comprises layers of adsorbent.

9. The process of claim 8, wherein the adsorbent layers comprise one or more silicon dioxide.

10. The process of claim 7, wherein the adsorbent mixture comprises adsorbent having at least two particle sizes.

11. The process of claim 1 further comprising a prior step, wherein the surface of the adsorbent is rendered inert via a calcination step prior to passing the gas feed through the bed.

12. The process of claim 11, wherein the adsorbent is calcined at temperatures of about 500 C to about 850 C.

13. The process of claim 12, wherein the adsorbent is calcined in a humid air environment.

14. The process of claim 1, wherein regenerating comprises heating the adsorbent to a temperature of about 80 C to about 200 C.

15. The process of claim 1, wherein regenerating removes at least about 95% of the siloxanes from the adsorbent.

16. The process of claim 1, wherein passing the gas feed through the bed reduces the siloxane level, on an elemental silicon basis, to less than 0.5 ppm.

17. The process of claim 1, wherein passing the gas feed through the bed reduces the siloxane level, on an elemental silicon basis, to less than 0.05 ppm.

18. The process of claim 1, wherein passing the gas feed through the bed reduces the siloxane level, on an elemental silicon basis, to less than 0.005 ppm.

19. The process of claim 9, wherein the adsorbent comprises Grades 59 and 127 silicon dioxide.

20. The process of claim 1, wherein the gas feed is obtained from a landfill, digester, or sewage treatment plant.

* * * * *